E. W. BURGESS.
CLUTCH MECHANISM FOR CORN PLANTERS.
APPLICATION FILED AUG. 23, 1915.

1,216,281.

Patented Feb. 20, 1917.
2 SHEETS—SHEET 1.

Inventor:
Edward W. Burgess.
By Chas. E. Lord
Atty.

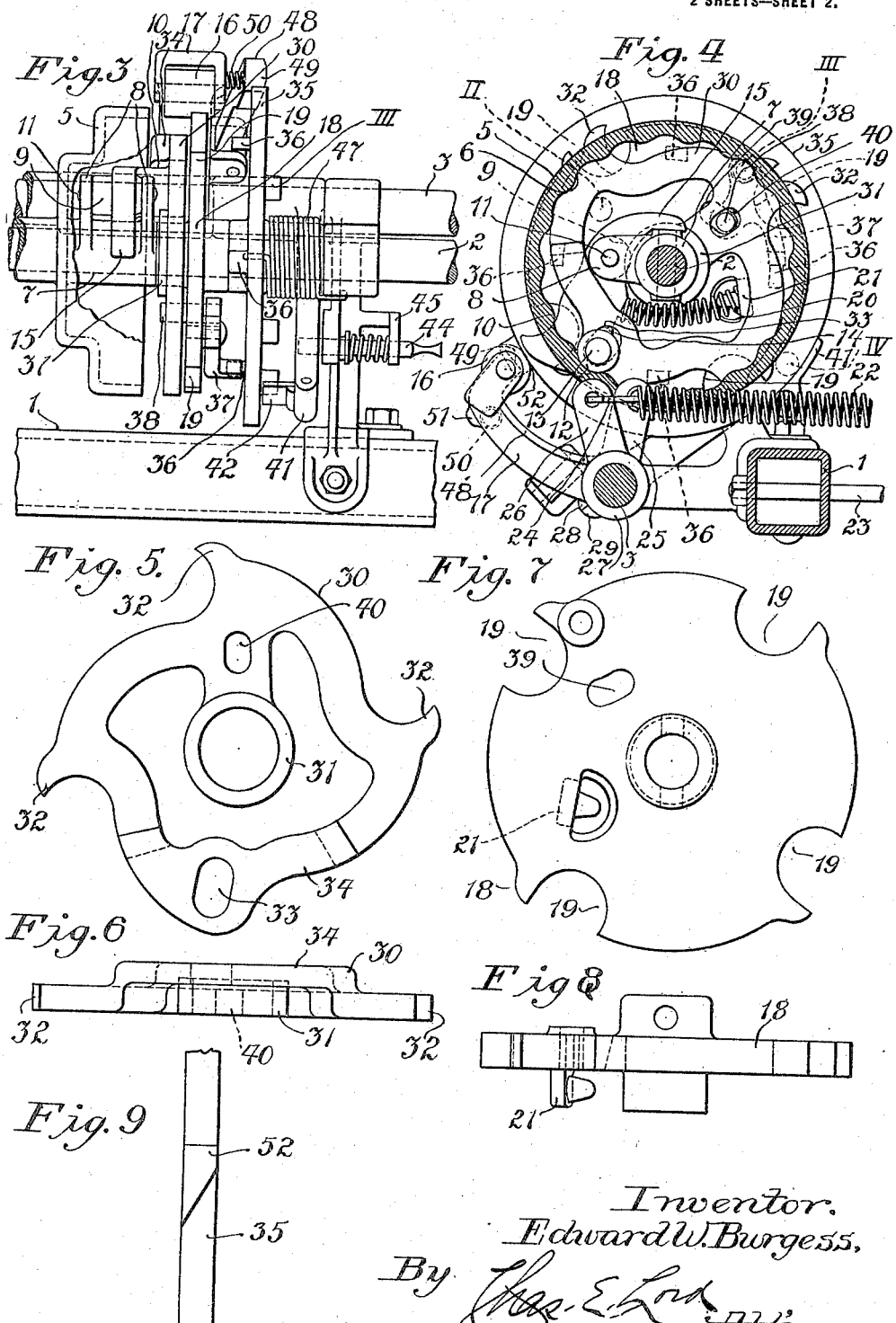

UNITED STATES PATENT OFFICE.

EDWARD W. BURGESS, OF CHICAGO, ILLINOIS, ASSIGNOR TO INTERNATIONAL HARVESTER CORPORATION, A CORPORATION OF NEW JERSEY.

CLUTCH MECHANISM FOR CORN-PLANTERS.

1,216,281.

Specification of Letters Patent.

Patented Feb. 20, 1917.

Application filed August 23, 1915. Serial No. 46,962.

*To all whom it may concern:*

Be it known that I, EDWARD W. BURGESS, a citizen of the United States, residing at Chicago, in the county of Cook and State of Illinois, have invented certain new and useful Improvements in Clutch Mechanism for Corn-Planters, of which the following is a full, clear, and exact specification.

This invention relates to corn planters in its general adaptation, and in particular to an improved form of clutch mechanism forming part of the associated mechanical elements that are operative to control the seed dropping means, and consists in an intermittently operating clutch mechanism connected with the feed shaft of a planter in a manner to transmit rotary movement thereto through its connection with the traction wheels when tripped into action automatically by means of a check wire or otherwise, and to means connected with the clutch tripping mechanism and operative to vary the degree of angular movement of the feed shaft whereby a variable number of kernels of corn may be dropped by the seed delivering mechanism connected with the feed shaft.

The object of the invention is to provide a clutch mechanism for the purpose indicated that will be positive in its operation, and one that may be readily adjusted while the planter is in operation to vary the number of kernels to each hill, and not liable to become disarranged or inoperative.

These objects are attained by means of mechanism, one embodiment of which is illustrated in the accompanying drawings, in which—

Figure 1 is a front elevation of a clutch mechanism embodying my invention, together with other operative parts of a corn planter;

Fig. 2 is an end elevation of Fig. 1;

Fig. 3 is a top plan view of the clutch mechanism and a part of other elements of a corn planter;

Fig. 4 is a side elevation, partly in section, of Fig. 3;

Fig. 5 is a plan view of a detail part of the clutch controlling mechanism;

Fig. 6 is a side elevation of Fig. 5.

Fig. 7 is a plan view of a fixed part of the clutch mechanism;

Fig. 8 is a side elevation of Fig. 7; and

Fig. 9 is a detail part of the clutch controlling mechanism.

Referring to the drawings, wherein the same reference characters designate like parts throughout the several views, 1 represents a transverse member of the runner frame of a corn planter, 2 the feed shaft, and 3 the valve controlling and clutch tripping rock shaft that may be operatively connected with a check wire mechanism (not shown). Journaled upon the feed shaft 2 is a combined sprocket wheel 4 and clutch member 5, having an internal toothed rim 6 common in clutch mechanism and adapted to receive continued rotation from a moving part of the planter mechanism. 7 represents a sleeve secured to the feed shaft 2 and having radially extending ear members 8, spaced apart longitudinally of the axis of the shaft and receiving between them a barrel member 9 forming part of a clutch pawl 10, the barrel member being journaled upon a pin 11 received by the ear members 8 and having its axis parallel with the axis of the feed shaft. The clutch pawl 10 carries a roller 12 that is journaled upon a stud 13 secured to the pawl, and 14 represents a laterally extending boss integral with the pawl and receiving the stud, and disposed between the roller and the pawl. The roller is adapted to engage with the teeth upon the rim 6 of the constantly rotatable clutch member 5 when the pawl is rocked in one direction, and to be released therefrom when the pawl is rocked in an opposite direction. The pawl is provided with a tail portion 15 that is adapted to engage with the sleeve 7 when the roller 12 engages with the clutch teeth upon the rim 6, and thereby cause the sleeve and feed shaft 2 to rotate with the clutch member 5. The clutch pawl 10 extends radially outward and is offset laterally from the roller 12, and the extension is adapted to engage with a roller 16 carried by a clutch tripping arm 17 journaled upon the shaft 3. 18 represents a disk secured to the feed shaft 2 adjacent the sleeve 7 and having semi-circular notches 19 in its periphery, preferably on radial lines disposed at angles of 90 degrees apart, and adapted to receive the roller 16 when it is moved to a position to engage with the clutch pawl 10 and disengage said pawl from the toothed rim 6, the pawl being normally moved in a direction to engage with the teeth upon the rim 6 by means of a compression spring 20 operative between an ear member 21 upon the side of the disk 18 and the pawl.

The shaft 3 and the arm 17 are rocked in a direction to cause the roller 16 to engage with the clutch pawl 10 by means including a tension spring 22, having one end connected with the upwardly turned end of a rod 23 that is adjustable longitudinally of the frame member 1, the opposite end of the spring being connected with an equalizing bar 24, having one end received by an opening in an ear member 25 integral with the hub of the arm 17, and its opposite end by an opening in an arm 26 integral with a sleeve 27 secured to the clutch tripping shaft 3. Integral with the sleeve 27 is a longitudinal and rotatably disposed tooth 28 adapted to engage with a corresponding tooth 29 carried by the hub of the arm 17 in a manner to cause the arm 17 to rock in a direction to trip the clutch mechanism into action when the tripping rock shaft is actuated by means of a check wire or otherwise, and the equalizing bar 24 will permit a limited independent movement of the two arms 17 and 26 in an opposite direction when the shaft 3 is released from control of the check wire.

The operation of the clutch as heretofore described is well-known in the art, wherein an intermittent predetermined movement of the mechanism is required at each actuation thereof. In the operation of corn planters it is required to vary the number of kernels delivered by each actuation of the seed delivering mechanism, which may be two, three or four, and this has been accomplished by means of changeable parts of the mechanism, as by seed plates or by providing a secondary clutch mechanism that is actuated by the primary means for varying the movement of the secondary clutch in a manner whereby the feed shaft is given a more or less angular movement at each actuation of the clutch mechanism, the degree of its angular movement being controlled by the operator.

My invention includes means whereby a single clutch mechanism may be controlled by the operator while the machine is in operation in a manner to cause a variable degree of angular movement of the feed shaft of a corn planter when actuated by the clutch mechanism. The mechanism whereby this result is attained includes the disk 18, with the semi-circular notches 19 upon its periphery, either of which may receive the roller 16 journaled upon the tripping arm 17.

30 represents a pawl controlling member having a hub 31 whereby it is journaled upon the end of the sleeve 7 between the disk 18 and the clutch rim 6, and provided with hook members 32 upon its periphery corresponding in form and position with the outwardly extending end of the pawl 10 relative to the notches 19. The pawl controlling member 30 is provided with a radially disposed slot 33 in a laterally offset part 34 that receives the boss 14 of the pawl 10, the hook members 32 being disposed in the same vertical plane as the extended end of the pawl 10.

35 represents a disk journaled upon the feed shaft 2, adjacent the hub of the disk 18, and provided with laterally extending concentrically disposed teeth 36 upon its inner side that are spaced 90 degrees apart angularly and with which a pawl 37 is adapted to engage, the pawl being pivotally mounted upon the disk 18 and controlled by means of a pin 38 carried by the pawl and received by a concentric slotted opening 39 in the disk 18, and a radially slotted opening 40 in the pawl controlling member 30. The disk 35 is provided upon its opposite side with a series of laterally disposed lugs designated by II, III, and IV, the lug IV being adjacent the periphery of the disk, the lug III being spaced radially inward from the periphery of the disk, and the lug II radially nearer the axis of the disk, the three lugs being placed angularly corresponding with the notches 19 and the teeth 36. 41 represents an arm pivotally mounted upon the clutch tripping shaft 3 and carrying at its free end a pivoted tumbler member 42 and a spring 43 that normally turns the tumbler within a path permitting it to engage selectively with the lugs II, III, and IV, determined by the angular adjustment of the arm 41 as controlled by a spring-pressed plunger bolt 44 carried by a bracket member 45 secured to the frame member 1 and having the feed shaft 2 journaled therein, the plunger bolt being adapted to be selectively received by any one of concentrically disposed lateral openings 46 in the free end of the arm 41, whereby the arm may be adjusted angularly within prescribed limits.

47 represents a coiled torsional spring surrounding the hub of the disk 35, having one end connected with the disk and its opposite end with the fixed bracket member 45, and is operative to normally turn the disk in a direction to carry one of the lugs, as IV, against the tumbler 42, as shown in Figs. 1 and 2. 48 represents a wing member having one end pivotally connected with the arm 17 adjacent the shaft 3, and its opposite end provided with a head member 49 that is adapted to engage with the inner face of the disk 35 beyond the path of movement of the pawl teeth 36 when the arm 17 and roller 16 are in a clutch disengaging position and to ride upon the periphery of the disk when the arm 17 has been tripped by the check wire, a compression spring 50 being operative between the arm and wing to normally separate them, and 51 represents a lip member carried by the arm and operative as a stop member to limit an outward swing of the wing. 52 represents a radially extending wiper cam upon the periphery of the disk 35, as shown in detail in Fig. 9, adapted to engage with the head member 49 of the wing member 48 in a manner to swing the wing inward until the head has been moved off the periphery of the disk, and then the reactive force of the spring 22 will swing the arm 17 toward the axis of the feed shaft 2, with the head 49 of the arm 17 engaging the inner surface of the disk 35.

The clutch mechanism as shown is adapted for use in connection with a corn planter having the seed delivering mechanism so constructed and operated as to deliver the maximum number of kernels, preferably four, if the feed shaft is given one complete revolution at each actuation thereof about the clutch mechanism; three kernels if the shaft is given three-fourths of a revolution; two kernels if the shaft is given one-half a revolution, and one kernel if the shaft is given one-fourth of a revolution. Although in the mechanism as shown there are only three lugs II, III, and IV upon the disk 35, it is apparent that another may be provided whereby the rotative movement of the feed shaft may be divided by quarters.

The function of the wing member 48 is to hold the arm 17 after it has been actuated by the check wire away from the pawl 10, while the clutch mechanism is rotating the feed shaft 2 through a predetermined degree of angular movement, and such degree is determined by the degree of angular movement of the disk 35 necessary to cause the wiper cam 52 to engage with the wing 48 and move it laterally of the periphery of the disk 35. The degree of angular movement of the disk 35 at each actuation of the clutch mechanism is controlled by the position of adjustment of the arm 41 as controlled by the spring-pressed plunger bolt 44 that may be selectively received by the openings 46 in the arm. When the arm 41 is adjusted to the position shown in Fig. 2, the lug designated by IV is in engagement with the spring-pressed tumbler member 42 carried by the arm 41, and the tripping arm 17 holds the clutch mechanism disengaged, and the wiper cam 52 is substantially upon a radial line with the axis of the roller 16. When the arm 17 is rocked by the check wire away from the clutch pawl 10 and the notches 19 in the disk 18, the spring 20 causes the pawl controlling member 30 to turn about its axis and thereby draw the pawl 10 into engagement with the toothed rim 6 and simultaneously draw the pawl 37 into engagement with one of the teeth 36 carried by the disk 35, whereby said disk is caused to rotate with the feed shaft and clutch mechanism. There is sufficient delay in the return movement of the tripping arm 17 after it has been disengaged from the clutch mechanism by means of the check wire to permit the disk 35 to carry the wiper cam 52 beyond the path of movement of the head 49 of the wing 48 and the head engages with and rides upon the periphery of the disk until it is moved therefrom by the wiper cam 52. When the disk 35 has made a complete revolution in the direction as shown by the arrow, when the wing 48 is disengaged from the periphery of the disk 35 and the arm 17 is thrown into position to disengage the clutch mechanism from the feed shaft, the disk 35 is rotated in a reverse direction by means of the spring 47 to its initial position with the lug IV engaging with the tumbler member 42, the function of the tumbler being to yieldingly permit a full throw of the lug in the direction of the arrow as the disk is given a complete revolution, and to operate as a stop for the disk when it is rotated in a reverse direction by means of the spring 47. When the arm 41 is adjusted in a direction permitting the spring-pressed plunger bolt 44 to be received by the middle opening of the series 46 in the arm, the tumbler 42 is within the path of movement of the lug III and the disks 35 will be rotated three-quarters of a revolution at each actuation of the clutch mechanism. If the arm be adjusted to permit the plunger bolt to be received by the lower opening of the series, the tumbler will be within the path of the lug II and the disk will be rotated one-half of a revolution at each actuation of the clutch mechanism, and the arm 41 may be adjusted by the operator as desired with the plunger in operation.

Having shown and described one embodiment of my invention, I do not desire that it be limited to the precise details of construction as illustrated, it being understood that many changes may be made in the form, proportion and organization of its various elements without departing from the spirit of my invention.

What I claim as my invention, and desire to secure by Letters Patent, is:

1. A clutch mechanism including, in combination, a shaft, a constantly rotatable clutch element journaled upon said shaft, a second clutch member secured to said shaft, an interlocking clutch element carried by said second clutch member and adapted to intermittently engage with said constantly rotatable member, a movable clutch tripping element, means for controlling a movement of said tripping element in one direction, said means including a controlling element vibratable about the axis of said shaft, means for connecting it with said interlocking element, and means for regulating the degree of vibration of said controlling element.

2. A clutch mechanism including, in combination, a shaft, a constantly rotatable clutch element journaled upon said shaft, a second clutch member secured to said shaft, an interlocking clutch element carried by said second clutch member and adapted to intermittently engage with said constantly rotatable member, a movable clutch tripping element, means for controlling a movement of said tripping element in one direction, said means including a disk journaled upon said shaft, means for operatively connecting said disk with said interlocking element in a manner to rotate with said shaft, a controlling element vibratable about the axis of said shaft, means for connecting it with said interlocking element, and means for regulating the degree of vibration of said controlling element.

3. A clutch mechanism including, in combination, a shaft, a constantly rotatable clutch element journaled upon said shaft, a second clutch member secured to said shaft, an interlocking clutch element carried by said second clutch member and adapted to intermittently engage with said constantly rotatable clutch element, a vibratable clutch tripping arm, means for controlling a movement of said arm, said means including a disk journaled upon said shaft, means for operatively connecting said disk with said interlocking element in a manner to rotate with said shaft, means for rotating said disk in an opposite direction, and a wiper cam carried by said disk and adapted to engage with said tripping arm.

4. A clutch mechanism including, in combination, a shaft, a constantly rotatable clutch element journaled upon said shaft, a second clutch member secured to said shaft, a pawl carried by said second clutch member and adapted to intermittently engage with said constantly rotatable clutch element, a vibratable clutch tripping arm adapted to engage said pawl, a laterally fixed pawl controlling member vibratable about the axis of said shaft, pivotally connected with said pawl and coacting with said tripping arm, a vibratable disk carried by said shaft and adapted to engage with said clutch tripping arm in a manner to suspend a movement thereof in one direction, said disk having a wiper cam upon its periphery operative to release said arm.

5. A clutch mechanism including, in combination, a shaft, a constantly rotatable clutch element journaled upon said shaft, a second clutch member secured to said shaft, a pawl carried by said second clutch member and adapted to intermittently engage with said constantly rotatable clutch element, a vibratable clutch tripping arm adapted to engage said pawl, a laterally fixed pawl controlling member vibratable about the axis of said shaft, pivotally connected with said pawl and coacting with said tripping arm, a disk carried by said shaft vibratable about the axis thereof and adapted to engage with said clutch tripping arm in a manner suspending a movement thereof in one direction, means for controlling the degree of angular vibration of said disk, and a wiper cam carried by said disk and operative to release said arm.

6. A clutch mechanism including, in combination, a shaft, a constantly rotatable clutch element journaled upon said shaft, a second clutch member secured to said shaft, a pawl carried by said second clutch member and adapted to intermittently engage with said constantly rotatable clutch element, a vibratable clutch tripping arm adapted to engage said pawl, a pawl controlling member vibratable about the axis of said shaft, said member having pivotal connection with said pawl and cooperating with said tripping arm, a disk journaled upon said shaft and operatively connected with said second clutch member and adapted to engage with said clutch tripping arm in a manner suspending a movement thereof in one direction, stop lugs carried by said disk, and an adjustable disk controlling member adapted to selectively engage with said lugs in a manner to vary the degree of angular movement of said disk, said disk having a wiper cam upon its periphery operative to release said tripping arm.

7. A clutch mechanism including, in combination, a shaft, a constantly rotatable clutch element journaled upon said shaft, a second clutch member secured to said shaft, a pawl carried by said second clutch member and adapted to intermittently engage with said constantly rotatable clutch element, a vibratable clutch tripping arm adapted to engage said pawl, a pawl controlling member vibratable about the axis of said shaft, said member having pivotal connection with said pawl and cooperating with said tripping arm, a disk journaled upon said shaft and operatively connected with said second clutch member in a manner to be rotated through a predetermined degree of angular movement in one direction when said clutch mechanism is actuated, and a spring mechanism operative to return said disk to its initial position, said disk being adapted to engage with said clutch tripping arm in a manner suspending a movement thereof in one direction, stop lugs carried by said disk, a swinging disk controlling member having a spring-pressed tumbler pivoted upon its free end, and means for adjusting said member to cause said tumbler to engage selectively with said stop lugs, said disk having a wiper cam upon its periphery adapted to release said tripping arm.

8. A clutch mechanism including, in combination, a shaft, a constantly rotatable clutch element journaled upon said shaft, a second clutch member secured to said shaft, a pawl carried by said second clutch member and adapted to intermittently engage with said constantly rotatable clutch element, a vibratable clutch tripping arm adapted to engage said pawl, a laterally movable wing carried by said arm, a pawl controlling member vibratable about the axis of said shaft, said member having pivotal connection with said pawl and coöperating with said tripping arm, a disk journaled upon said shaft and operatively connected with said second clutch member in a manner to be rotated through a predetermined degree of angular movement in one direction when said clutch mechanism is actuated, a spring mechanism operative to return said disk to its initial position, said movable wing having a head adapted to engage with the periphery of said disk in a manner suspending a movement of said arm in one direction, and a wiper cam carried by said disk and adapted to release said wing.

9. A clutch mechanism including, in combination, a shaft, a constantly rotatable clutch element journaled upon said shaft, a second clutch member secured to said shaft, a pawl carried by said second clutch member and adapted to intermittently engage with said constantly rotatable clutch element, a vibratable clutch tripping arm adapted to engage said pawl, a laterally movable wing carried by said arm, a pawl controlling member vibratable about the axis of said shaft, said member having pivotal connection with said pawl and coöperating with said tripping arm, a disk journaled upon said shaft and operatively connected with said second clutch member in a manner to be rotated through a predetermined degree of angular movement in one direction when said clutch mechanism is actuated, spring mechanism operative to return said disk to its initial position, stop lugs carried by said disk, an adjustable arm adapted to selectively engage with said lugs in a manner to vary the degree of angular movement of said disk, said vibratable wing having a head adapted to engage with the periphery of said disk in a manner suspending a movement of said tripping arm in one direction, and a cam extending radially across the periphery of said disk and adapted to release said wing.

10. A clutch mechanism including, in combination, a shaft, a constantly rotatable clutch element journaled upon said shaft, a second clutch member secured to said shaft, a pawl carried by said second clutch member and adapted to intermittently engage with said constantly rotatable clutch element, a vibratable clutch tripping arm adapted to engage said pawl, a laterally movable wing carried by said arm, a pawl controlling member vibratable about the axis of said shaft, said member having pivotal connection with said pawl and coöperating with said tripping arm, a disk journaled upon said shaft and operatively connected with said second clutch member in a manner to be rotated through a predetermined degree of angular movement in one direction when said clutch mechanism is actuated, spring mechanism operative to return said disk to its initial position, and stop lugs carried by said disk and spaced apart radially and circumferentially.

11. A clutch mechanism including a shaft, a constantly rotatable clutch element journaled upon said shaft, an intermittently rotatable clutch element secured to said shaft and carrying a pivoted pawl adapted to engage said constantly rotatable clutch element, a movable clutch tripping arm adapted to engage with said pawl, a spring-pressed wing carried by said arm, a pawl controlling member vibratable about the axis of said shaft and operatively connected with said pawl, said pawl controlling member being provided with a series of angularly spaced pawl tripping elements adapted to engage said clutch tripping arm, a disk vibratable about the axis of said shaft and engaging with the spring-pressed wing carried by said clutch tripping arm in a manner suspending a movement of said arm in one direction, and means for regulating the degree of angular vibration of said disk, said disk being provided with a wiper cam adapted to release said wing.

12. A clutch mechanism including a shaft, a constantly rotatable clutch element journaled upon said shaft, an intermittently rotatable clutch element secured to said shaft and carrying a pivoted pawl adapted to engage said constantly rotatable clutch element, a movable clutch tripping arm adapted to engage with said pawl, a spring-pressed wing carried by said arm, a pawl controlling member vibratable about the axis of said shaft and operatively connected with said pawl, said pawl controlling member being provided with a series of angularly spaced pawl tripping elements adapted to engage said clutch tripping arm, a disk vibratable about the axis of said shaft and engaging with the spring-pressed wing carried by said clutch tripping arm in a manner suspending a movement of said arm in one direction, and means for regulating the degree of angular vibration of said disk, said means including laterally extending lugs spaced apart radially and circumferentially on the face of said disk, an arm adjustably mounted upon a relatively fixed part of the mechanism and adapted to selectively engage with said lugs, said disk being provided with a wiper cam adapted to release said wing at the limit of throw of said disk in one direction.

13. A clutch mechanism including a shaft, a constantly rotatable clutch element journaled upon said shaft, an intermittently rotatable clutch element secured to said shaft and carrying a pivoted pawl adapted to engage said constantly rotatable clutch element, a movable clutch tripping arm adapted to engage with said pawl, a spring-pressed wing carried by said arm, a pawl controlling member vibratable about the axis of said shaft and operatively connected with said pawl, said pawl controlling member being provided with a series of angularly spaced pawl tripping elements adapted to engage said clutch tripping arm, a disk secured to said shaft and having spaced notches upon its periphery adapted to engage with said clutch tripping arm, a second pawl carried by said disk and controlled by said vibratable pawl controlling member, a second disk vibratable about the axis of said shaft and having a series of pawl engaging teeth upon its side adapted to engage said second pawl and its periphery adapted to engage with said spring-pressed wing in a manner suspending a movement of said clutch tripping arm in one direction, and means for regulating the degree of angular vibration of said second disk, said second disk being provided with a wiper cam adapted to release said wing.

In testimony whereof I affix my signature.

EDWARD W. BURGESS.

Copies of this patent may be obtained for five cents each, by addressing the "Commissioner of Patents, Washington, D. C."